(12) United States Patent
Gieseke (10) Patent No.: US 9,409,712 B2
(45) Date of Patent: Aug. 9, 2016

(54) APPARATUS FOR GRASPING, LIFTING AND MOVING A LARGE PANEL

(76) Inventor: Gerald G. Gieseke, Selah, WA (US)

( * ) Notice: Subject to any disclaimer, the term of this patent is extended or adjusted under 35 U.S.C. 154(b) by 1 day.

(21) Appl. No.: 13/291,023

(22) Filed: Nov. 7, 2011

(65) Prior Publication Data
US 2013/0113228 A1 May 9, 2013

(51) Int. Cl.
*B65G 7/12* (2006.01)

(52) U.S. Cl.
CPC ........................................ *B65G 7/12* (2013.01)

(58) Field of Classification Search
CPC .................................... B65G 7/12; B66C 1/48
USPC ............................. 294/15, 16, 164, 901, 902
See application file for complete search history.

(56) References Cited

U.S. PATENT DOCUMENTS

| | | | | |
|---|---|---|---|---|
| 836,740 A | * | 11/1906 | Dettenborn | 294/16 |
| 1,215,350 A | * | 2/1917 | Dietrich | 294/86.4 |
| 1,837,425 A | * | 12/1931 | Gastan | 294/114 |
| 1,982,225 A | * | 11/1934 | Miller | 294/86.4 |
| 2,850,318 A | * | 9/1958 | Mulhern | 294/86.4 |
| 3,000,662 A | * | 9/1961 | Scarlett | 294/103.1 |
| 3,253,849 A | * | 5/1966 | Hansen | 294/16 |
| 3,374,024 A | * | 3/1968 | Reynolds | 294/16 |
| 3,524,670 A | * | 8/1970 | Ratomir | 294/164 |
| 4,349,225 A | | 9/1982 | Collins et al. | |
| 6,113,167 A | * | 9/2000 | Mattis et al. | 294/16 |
| 6,494,513 B2 | * | 12/2002 | Worthington | 294/16 |
| 7,003,917 B2 | | 2/2006 | Hetherington et al. | |

* cited by examiner

Primary Examiner — Dean Kramer
(74) Attorney, Agent, or Firm — Floyd E. Ivey

(57) ABSTRACT

A panel gripping and lifting device (100) having a clamping assembly (105) having a handle assembly (162) rotatably interrelated with a spaced apart opposing jaw assembly (107) by a cam assembly (149). Jaws of the opposing jaw assembly (107) have a planar jaw inner surface (116); when the spacing between the jaws is increased, the planar jaws are fitted on either side of a panel; when the spacing between the jaws is lessened the planar jaws contact surfaces of the panel exerting a gripping force against the panel. When gripping forces are exerted against the panel the handle assembly (162) enables the lifting and moving of the panel such as seated multipane window (220) window frame (200) having an outwardly extending nail fin (210) or a sheet metal panel.

An alternative embodiment has opposing jaws rotating in the same plane and separated by jaw spacing. A first jaw and a second jaw are positioned on either side of a frame channel and, when the embodiment is rotated the jaw spacing is lessened causing the first jaw and the second jaw to clamp against the frame channel thereby allowing lifting of large framed units such as glass door units.

14 Claims, 11 Drawing Sheets

APPARATUS FOR GRASPING, LIFTING AND MOVING A LARGE PANEL

FIELD OF THE INVENTION

This is a Continuation-in-Part pending from patent application 13/291,023 Titled "APPARATUS FOR GRASPING, LIFTING AND MOVING A LARGE PANEL" TO INVENTOR GIESEKE. THE CIP APPLICATION SPECIFICATION AND CLAIMS ADDED WITH THIS CIP IS DISPLAYED IN BOLD PRINT. This invention relates in general to lifting and moving large panels, and, for this CIP, the invention relates additionally to lifting and moving large panels not having fins but having channels. More particularly the invention relates to lifting and moving sealed multi-pane window units, when framed and prior to framing and when sealed, and also sheet metal panels and other panel structures.

BACKGROUND OF THE INVENTION

In the typical multi-pane fabrication process glass panes will be moved to an assembly area. The glass panes will be joined with sealing methods and then moved to other assembly areas where frames are affixed. The frames typically have formed at the frame perimeter an outwardly extending nail fin. Sliding glass door units comprise large panels which may not have outwardly extending nail fins but rather, at each side of the door units there are generally opposing channels at the exterior and interior of the door unit frame. Framed and unframed multi-pane units are heavy and awkward in handling and moving. Sheet metal panels are frequently moved within sheet-metal shops between fabrication stations. Other industries employ heavy and difficult to move panels.

OSHA, NIOSH and other governmental and safety Departments of Labor and Industry note back injuries and identify two contributing factors including twisting (asymmetry) and the quality of the worker's grip on the load (coupling). The device disclosed herein allows the worker to lessen twisting and to increase the effective hold or grip on the load lifting device thereby increasing the quality of the grip on the load. The device of this invention is a device to grasp, lift and move panels.

The patents and publications referred to herein are provided herewith in an Information Disclosure Statement in accordance with 37 CFR 1.97.

SUMMARY OF THE INVENTION

The present is a panel gripping and lifting device (100) comprising a clamping assembly (105) having a handle assembly (162) which is rotatably interrelated with a spaced apart opposing jaw assembly (107) by a cam assembly (149). Jaws of the opposing jaw assembly (107) have a planar jaw inner surface (116). When the spacing between the jaws is increased, the planar jaws are fitted on either side of a panel; when the spacing between the jaws is lessened the planar jaws contact surfaces of the panel exerting a gripping force against the panel. When gripping forces are exerted against the panel the handle assembly (162) enables the lifting and moving of the panel such as sealed multi-pane window (220) window frame (200) having an outwardly extending nail fin (210) or a sheet metal panel.

An alternative embodiment has a handle assembly (1620) supporting a clamping assembly (1005) comprised of an opposing planar jaw assembly (1007) which is pivotally affixed, by pivotally affixing means, to the handle assembly (1620). The said opposing jaw assembly (1007) presents a first jaw (1100) and a second jaw (1200) which clamp to a frame channel (2000) allowing lifting and moving of items such as glass door frame units and multi-pane window units.

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein:

FIGS. 1, 1A, 2, 2A, 9 and 15 illustrate the panel gripping and lifting device (100) showing the clamping assembly (105), first jaw (110), second jaw (120), jaw spacing (125), jaw interconnection stabilizer (130), jaw spacer (140), cam (150), cam rest (152), cam lobe (154). handle assembly (162), cam follower (160), cam follower shaft (165), handle (170), handle grip (172), handle grip bolt (173), handle pivot bolt (175) and jaw surface (180).

FIGS. 9, 15 and 15A illustrate the cam follower (160), cam follower shaft (165), handle (170), handle pivot bolt (175). The cam follower (160) seen in FIG. 9 is formed by the end of a blunt shaft. The cam follower (160) seen in FIG. 15 is formed by a roller. Also shown in FIG. 15B is the positioning of the cam (150) formed on the handle (170).

FIGS. 8 to 10 show the panel gripping and lifting device (100), clamping assembly (105) and handle assembly (162) with the first jaw (110) and second jaw (120) spaced apart, advancing to place the first jaw (110) and the second jaw (120) on either side of a panel, shown as a window frame (200) with an extending nail fin (210). The FIGS. 8 to 10 additionally show the nail fin (210) engaged by the first jaw (110) and the second jaw (120) as jaw spacing (125) is varied by cam action as the handle assembly (162) is rotated. Illustrated is the compression of the jaw spacer (140).

FIGS. 29 to 32 illustrate a panel gripping and lifting device (1000) with a handle assembly (1620) supporting a clamping assembly (1005) and an opposing planar jaw assembly (1007). Seen is a first jaw (1100), a first jaw spring (1105), a second jaw (1200), jaw top edges (1130), jaw bottom edges (1140) and jaw outer surfaces (1150). Also seen is jaw spacing (1250), shaft apertures (1300), interconnection shafts (1301). At the second jaw (1200) is seen a jaw arm (1400), a jaw arm first end (1403), jaw arm second end (1407), jaw arm stop (1410), handle stop (1710), jaw arm recess (1450) and jaw arm rotation (1412). Also seen is a handle (1700) and illustrated is a frame channel (2000).

Seen in FIGS. 30, 31, 32, 33, 34, 35 and 36 are jaw interconnection stabilizer (130), first jaw (110), second jaw (120), spaced apart opposing jaw assembly (107), jaw interconnection stabilizer (130) composed of a sheet metal strip (205) and (210). Also seen is a handle pivot bolt (175), a jaw outer surface (115), a jaw inner surface (116), a jaw bottom edge (114), a jaw top edge (113), a jaw front edge (117) and a jaw rear edge (118). Also illustrated is a cam (150), cam radius (151), cam lobe (154), jaw top edge (113), spaced apart opposing jaw assembly (107) and a cam follower (160).

DETAILED DESCRIPTION OF THE INVENTION

The preferred embodiment of the apparatus of this disclosure is seen in FIG. 1, 1A, 2, 2A and 9 illustrating a panel gripping and lifting device (100) comprising the following a clamping assembly (105) having a handle assembly (162) rotatably interrelated with a spaced apart opposing jaw assembly (107) by a cam assembly (149). The jaws of the opposing jaw assembly (107) have a planar jaw inner surface (116). When the spacing between the jaws is increased, the planar jaws are fitted on either side of a panel and when the spacing between the jaws is lessened the planar jaws contact surfaces of the panel exerting a gripping force against the panel. When gripping forces are exerted against the panel the handle assembly (162) enables the lifting and moving of the panel such as sealed multi-pane window (220) window frame (200) having an outwardly extending nail fin (210) or a sheet metal panel.

Seen in FIGS. 1, 1A, 2, 2A, 3, 3A, 3B, 4-7 and 11-29 is the jaw assembly (107) which comprises a planar first jaw (110) in parallel with a planar second jaw (120). The said first jaw (110) and said second jaw (120) are spaced apart by a jaw spacing (125) and are moveably interconnected by at least one rigid jaw interconnection stabilizer (130). An elastic jaw spacer (140) is placed, in the jaw spacing (125), between said first jaw (110) and said second jaw (120) at or proximal to the jaw top edge (113). The spacing of the spaced apart opposing jaw assembly (107) is lessened and increased by a cam function of the cam assembly (149), activated by the rotation of the handle assembly (162), by compression and relaxation of the of the said jaw spacer (140).

As seen in the Figures, the said planar first jaw (110) and the said planar second jaw (120) each have a jaw outer surface (115) and a jaw inner surface (116). The said first jaw (110) and said second jaw (120) each have a jaw top edge (113) a jaw bottom edge (114), a jaw front edge (117) and a jaw rear edge (118). The elastic jaw spacer (140) is comprised of at least one spring or an elastomer. The inner jaw surface (116) may be rough or covered with a poly or rubber material to facilitate friction and a secure grasp of a panel.

illustrated in 1, 1A, 2, 2A, 9, 15, 15A, 15B, 17, 19, is a the handle assembly (162) which is rotatably fixed to the planar first jaw (110) and the planar second jaw (120) by at least at least one rigid jaw interconnection stabilizer (130) comprising a handle pivot (175).

Seen in FIGS. 1, 1A, 2, 2A, 4 and 8-10 is the elastic jaw spacer (140) shown as 30 comprised of an elastomer the said elastomer extends from or proximal to the jaw top edge (113) toward the jaw bottom edge (114) terminating intermediate the jaw top edge (113) and the jaw bottom edge (114); the at least one rigid jaw interconnection stabilizer (130), interconnecting the said first jaw (110) and the said second jaw (120) proximal the jaw top edge (113), penetrate the said elastomer.

Shown in FIGS. 1, 1A, 2, 2A, 9, 15, 15A and 15B is the handle assembly (162) which is comprised of a handle frame (170) having an upwardly extending "U" shaped handle top yoke (171) and a downwardly extending inverted "U" shaped handle bottom yoke (174). The said handle top yoke (171) having an upwardly extending handle top yoke first arm (181) and an upwardly extending handle top yoke second arm (182). There is a handle grip (172) rotatably positioned between said handle top yoke first arm (181) and handle top yoke second arm (182) by a handle grip bolt (173). The said handle bottom yoke (174) having a downwardly extending handle bottom yoke first arm (185) and a handle bottom yoke second arm (186). Each of the said bottom yoke first arm (185) and the said bottom yoke second arm (186) has a handle arm cam surface(187). When the said first jaw (110) and said second jaw (120) are spaced apart by the maximum jaw spacing (125) the jaw assembly (107) fits between the said bottom yoke first arm (185) and the said bottom yoke second arm (186). A handle pivot bolt (175) extends through the said bottom yoke first arm (185), slidably extends through the said first jaw (110), the elastic jaw spacer (140), the said second jaw (120) and the said bottom yoke second arm (186) and thereby rotatably interconnects the said handle assembly (162) with the said jaw assembly (107).

illustrated in FIGS. 1, 1A, 2, 2A, 3, 3A, 3B, 5, 7, 9, 11-15, 15A, 15B, 16-20, 22 and 24-28 is a cam assembly (149) which is comprised of a cam (150) aligned with a cam follower (160) and is assembled in said panel gripping and lifting device (100) so that the cam follower (160) is in contact with the cam (150) when the said handle assembly (162) is rotated.

As seen in the Figures, the handle pivot bolt (175) extends through the said first jaw (110), the elastic jaw spacer (140) and the said second jaw (120) proximal the said jaw top edge (113). The cam (150) has a cam rest (152) and a cam lobe (154). When the cam follower (160) is positioned at the cam rest (152), the jaw spacing (125) is at the maximum width.

Seen in FIGS. 1, 1A, 2, 2A, 4, 7-10,15, 15A, 30, 32, 34 and 35 are jaw interconnection stabilizer (130) which are generally rigid and comprised of high strength metal, poly or carbon fiber materials. Representations of the jaw interconnection stabilizer (130) are seen as bolts or sheet metal strips which serve to stabilize the first jaw (110), elastic jaw spacer (140) and second jaw (120) and the interconnection of the jaw assembly (107) with the handle assembly (162). When the jaw interconnection stabilizer (130) is composed of a sheet metal strip (205) and (210) the handle will be interconnected with a jaw interconnection stabilizer (130) comprised of a handle pivot bolt (175) thereby allowing rotation of the handle assembly (162). In the preferred embodiment the handle pivot bolt (175) comprises one of a plurality of bolts comprising jaw interconnection stabilizers (130).

In the preferred embodiment the jaw interconnection stabilizer (130) are comprised of bolts which slide relative to the opposing planar jaw assembly (107). An alternative embodiment comprises the jaw interconnection stabilizer (130) as formed from sheet metal.

Figure 1:
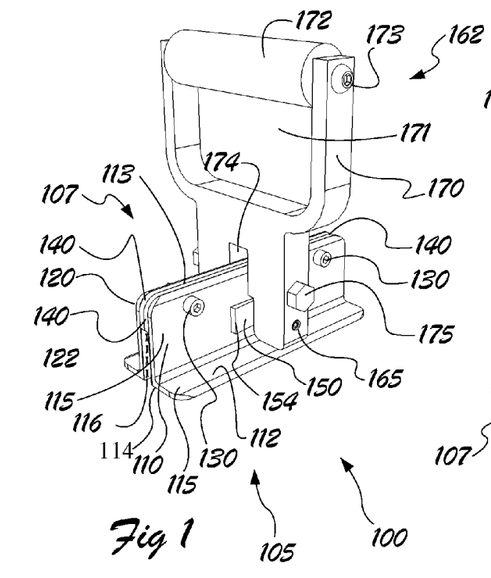
Figure 1A:
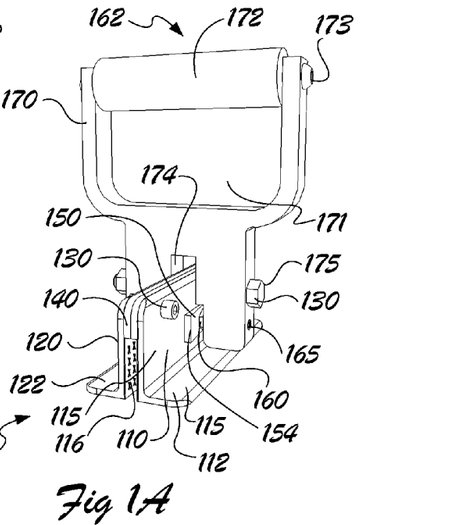
Figure 2:
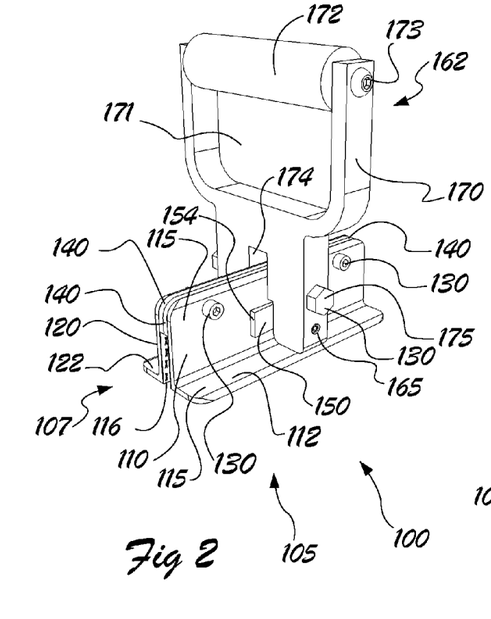
Figure 2A:
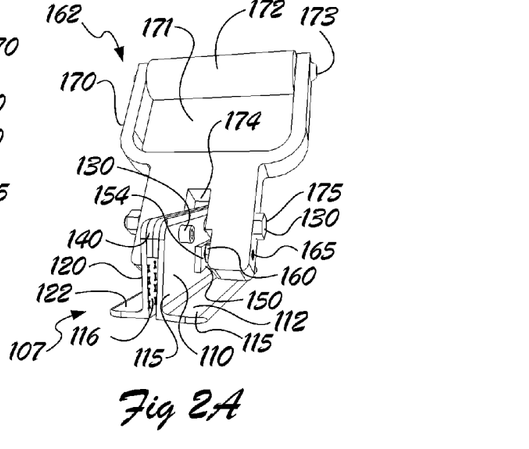
Figure 3:
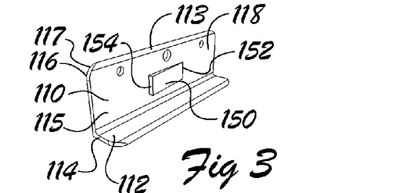
FIGS. 3, 3A, 4 to 7, 11 to 14, 16, 18, 20 to 28 show the first jaw (110), second jaw (120), jaw spacing (125), jaw interconnection bolt (130), jaw spacer (140), cam (150), cam rest (152), cam lobe (154). Additionally seen in FIGS. 11 to 14 is cam recessed (155), cam lobe recessed (157) and cam rest recessed (159). Additionally seen in FIGS. 16, 18 and 20 to 23 is cam cutout (320), cam lobe cutout (322) and cam rest cutout (324). Also seen in FIGS. 24 to 28 is the cam (150) formed by stamping. Also seen is the jaw surface (180). Additionally seen in FIG. 3A is the cam (150) formed with a cam radius (151). Seen in FIG. 3B is the first jaw (110) and or second jaw (120) illustrating the cam follower (160) positioned on the first jaw (110) and or the second jaw (120). Also seen in FIGS. 12 to 14 are sections from FIG. 11 illustrating the cam recess. Seen in FIGS. 25 to 28 are sections from FIG. 24 illustrating the cam formed by stamping.
Figure 3A:
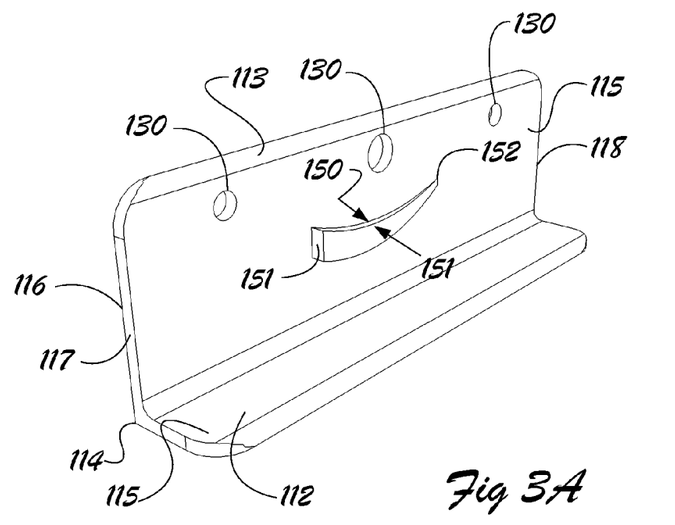
Figure 3B:
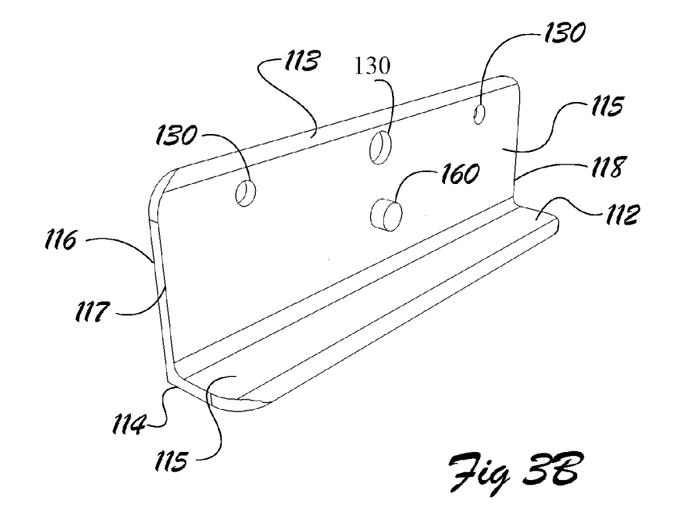
Figure 4:
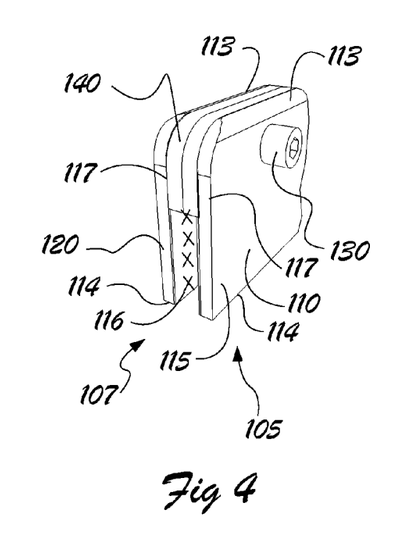
Figure 5:
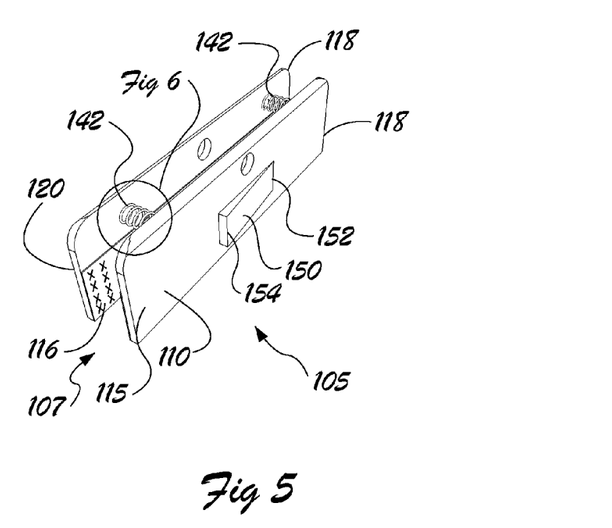
Figure 6:
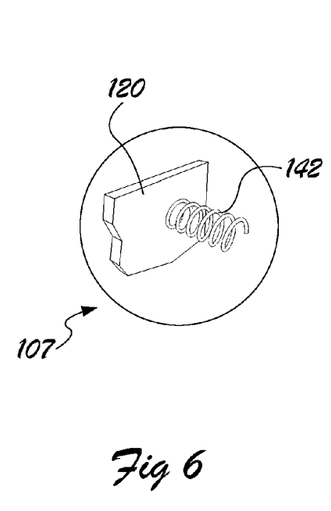
Figure 7:
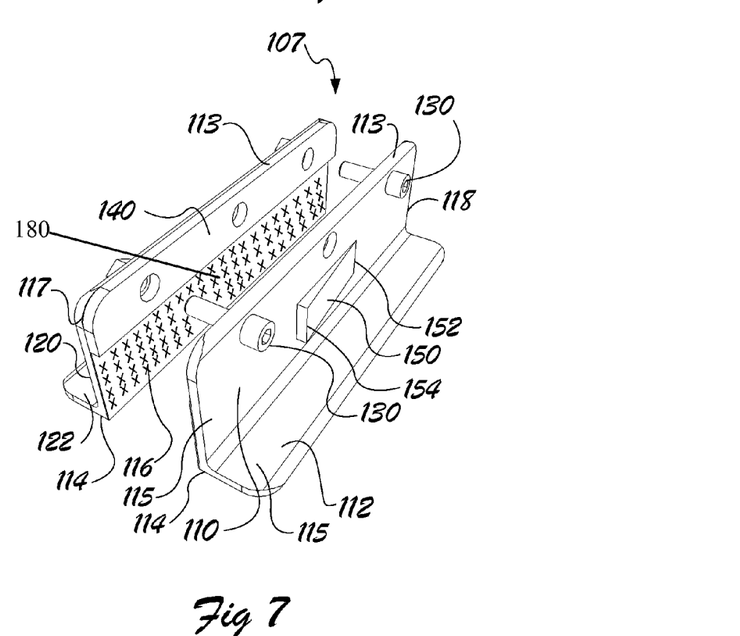
Figure 8:
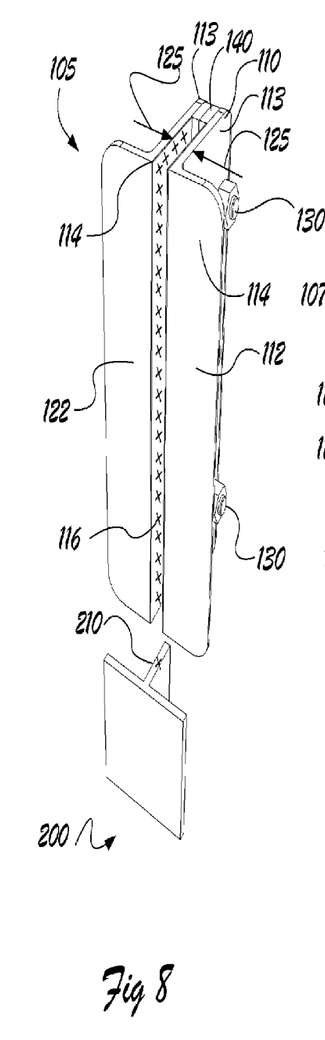
Figures 9, 10:
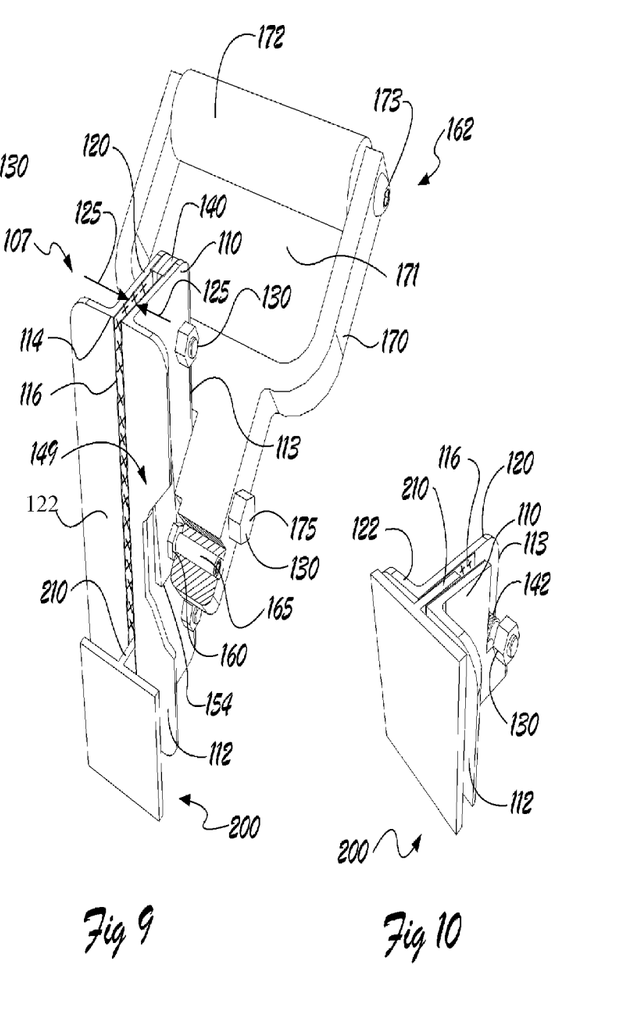
Figure 11:
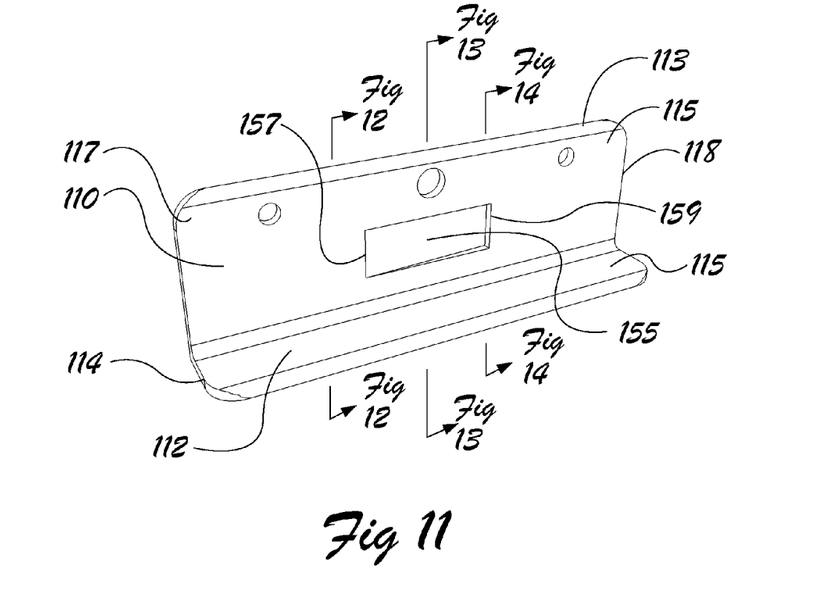
Figures 12, 13, 14:
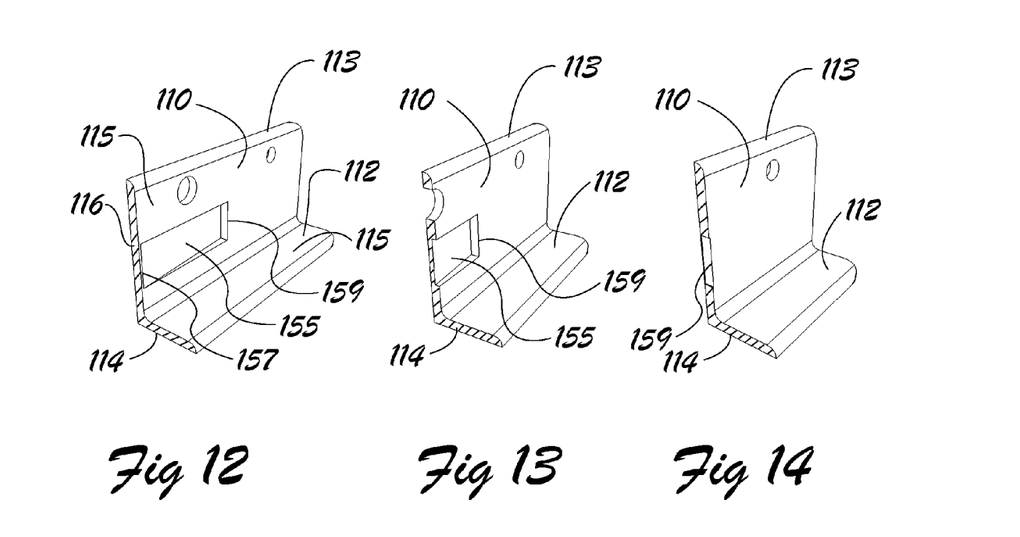
Figure 15:
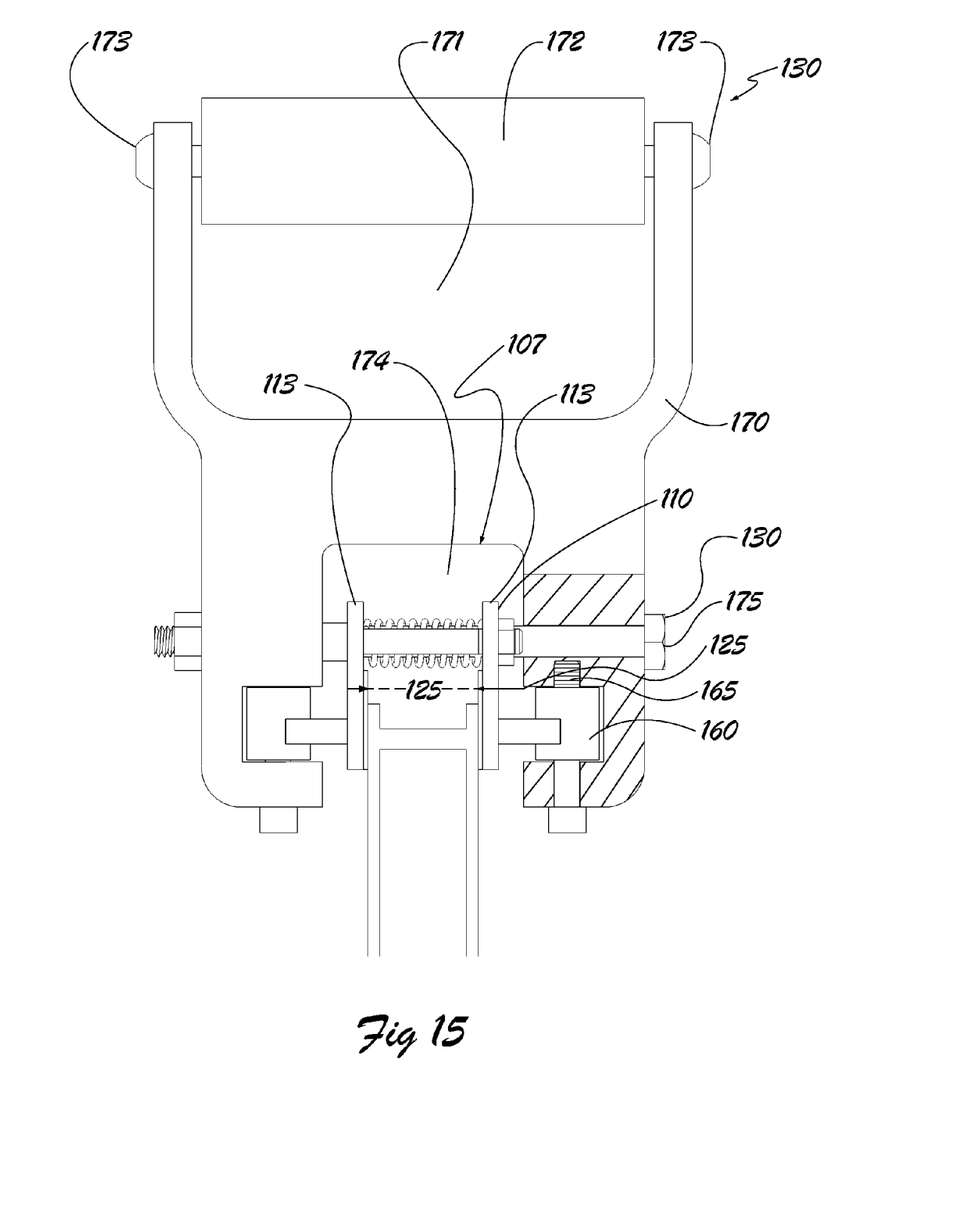
Figure 15A:
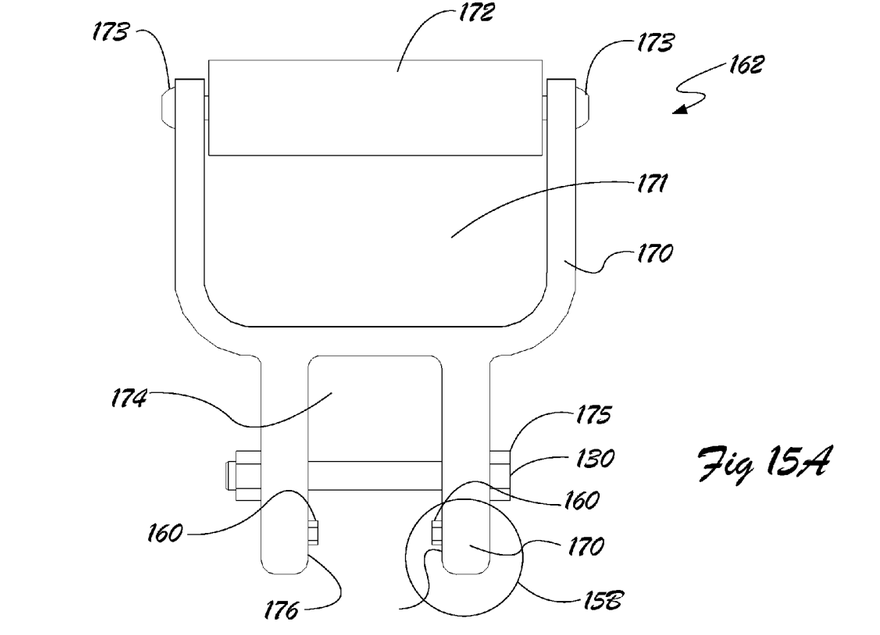
Figure 15B:
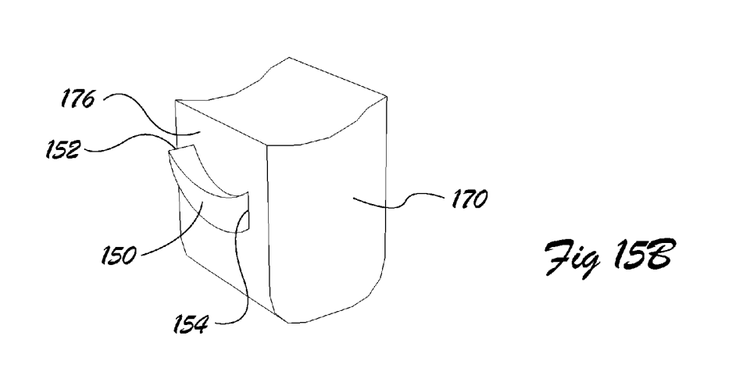
Figure 16:
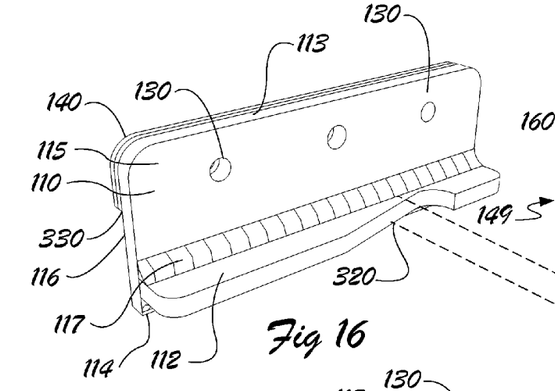
Figure 17:
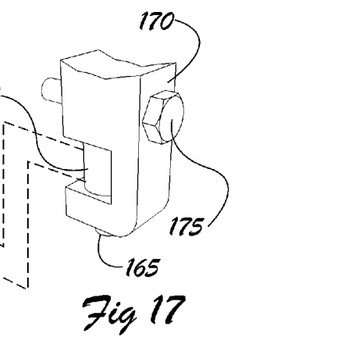
FIGS. 17 and 19 are exploded details showing a portion of the handle assembly (162), the cam follower (160) as a roller and the cam follower shaft (165).
Figures 18, 19, 20:
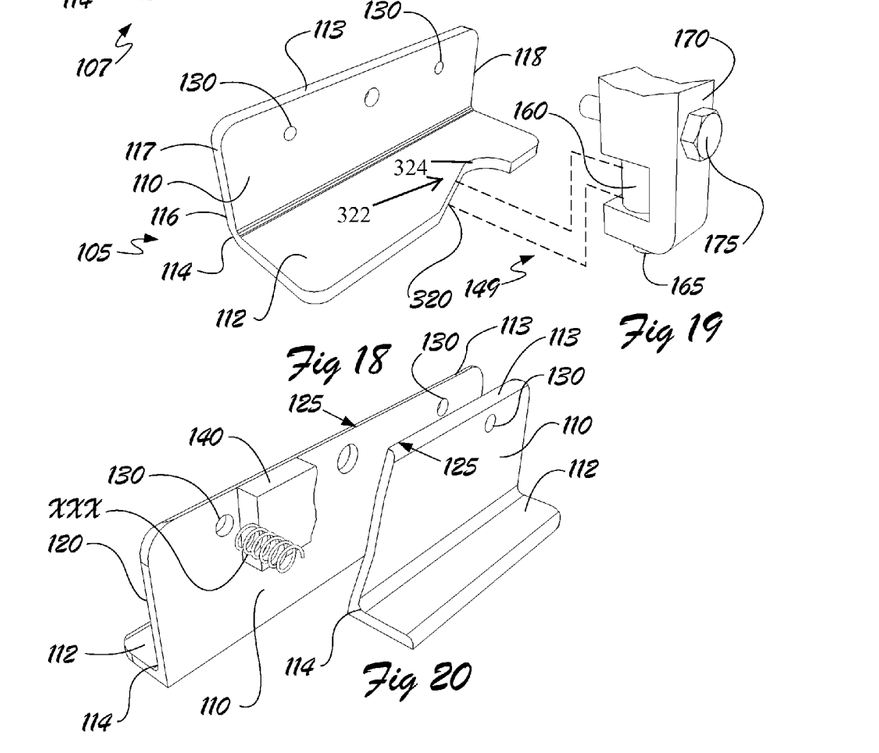
Figure 21:
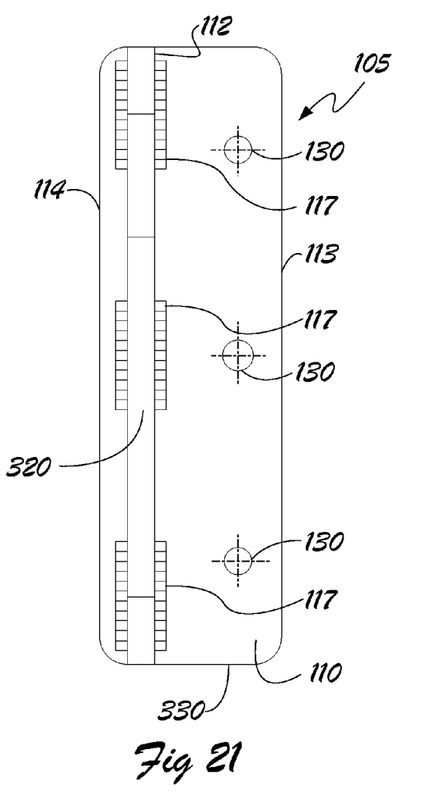
Figure 22:
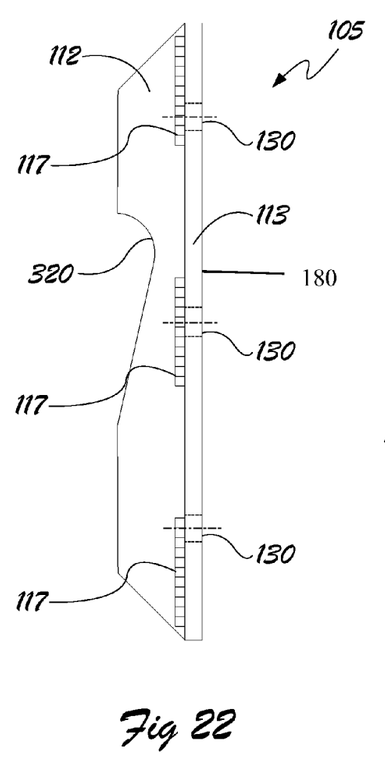
Figure 23:
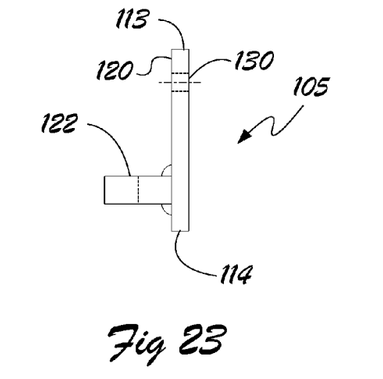
Figure 24:
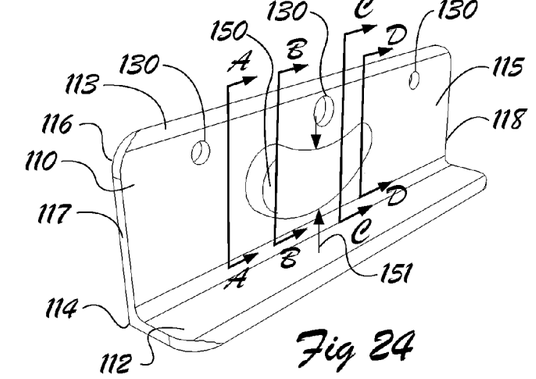
Figure 25:
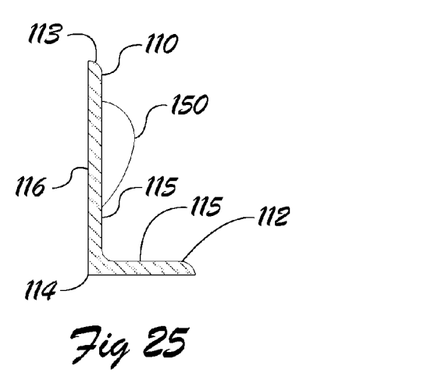
Figure 26:
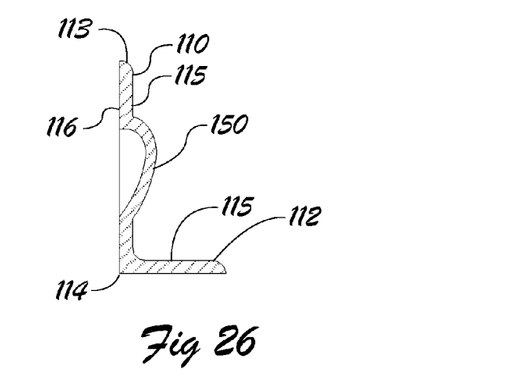
Figure 27:
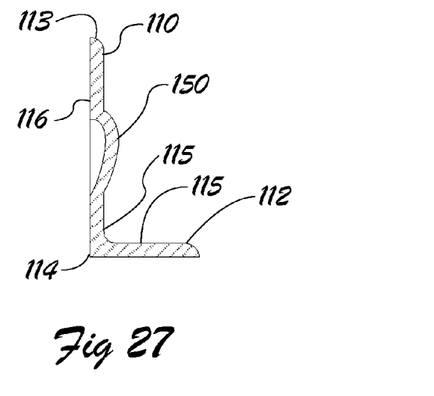
Figure 28:
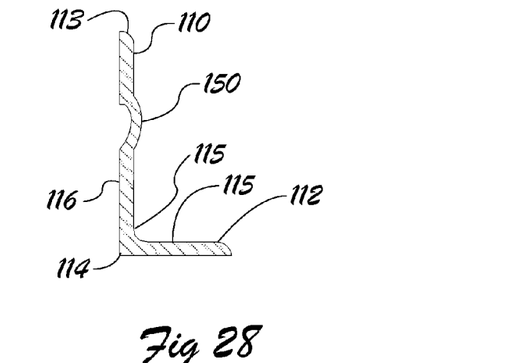
Figure 29:
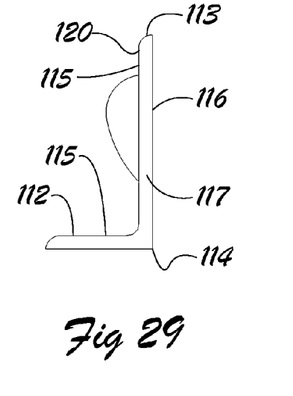
Figures 30, 31, 32, 33, 34:
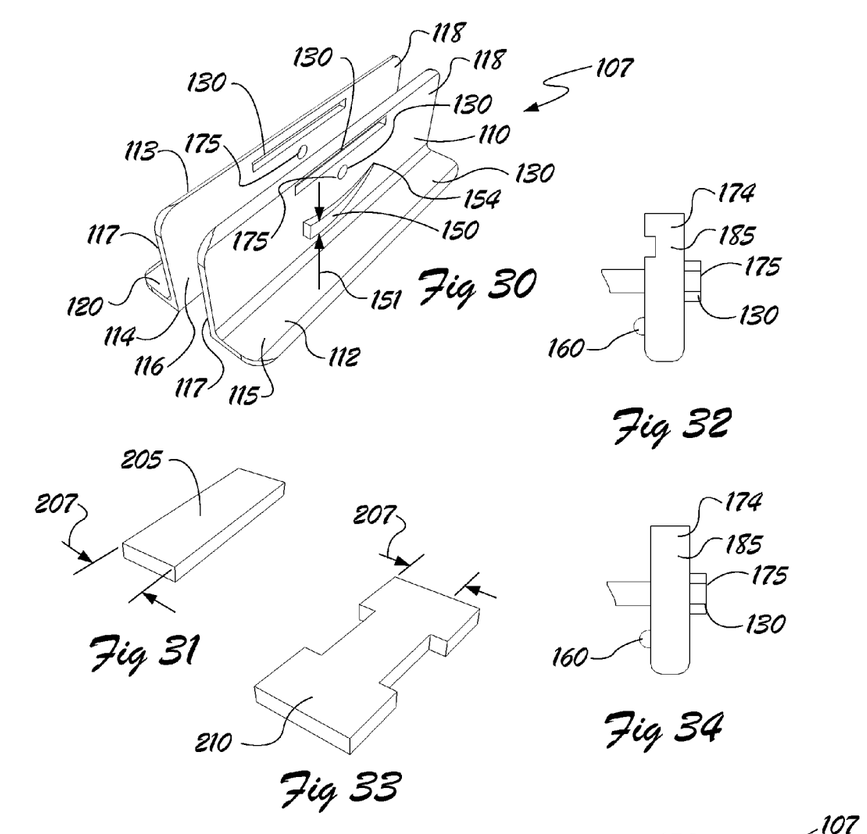
Figures 35, 36:
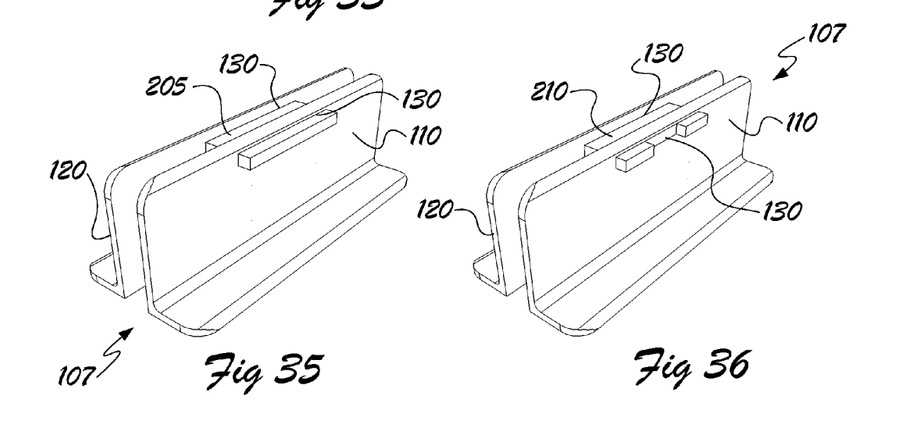

In the preferred embodiment the said cam (150) is formed at one or both of the jaw outer surface (115) of the said first jaw (110) and or the said second jaw (120). That is, the cam function is fulfilled when one cam (150) is used. In the preferred embodiment a cam (150) is formed on each of the jaw outer surfaces (115). In the preferred embodiment the cam (150) has a radius corresponding to the cam radius (151) transcribed by the rotation of the handle assembly (162). The cam radius (151) is illustrated in FIGS. 3A, 24 and 29.

When, in the preferred embodiment, the said cam assembly (149) is formed at one or both of the jaw outer surface (115) of the said first jaw (110) and or the said second jaw (120), the said cam follower (160) is integral to handle bottom yoke first arm (185) and or the said handle bottom yoke second arm (186) extending toward the said proximal jaw outer surface (115) from the handle arm cam surface (187). The cam follower (160), at the point of contact with the cam (150) may be a softer metal such as brass or of a metal and or material with wear resistant and low abrasive characteristics so as to lessen wear of the cam (150). In this preferred embodiment the cam (150) is outwardly extending from the said one or both jaw outer surface (115) or is recessed and inwardly extending from the said one or both jaw outer surface (115). When the said cam follower (160) is integral to the handle arm cam surface (187), the cam follower (160) is the end of a removable cam follower shaft (165) which extends through the handle bottom yoke first arm (185) and or the said handle bottom yoke second arm (186) presenting the cam follower (160) at the handle arm cam surface (187) for contact with the cam (150).

The cam follower (160), in an alternative embodiment, is formed at one or both of the jaw outer surface (115) of the said first jaw (110) and or the said second jaw (120). The cam follower (160) is outwardly extending from the jaw outer surface (115) and may be formed by a number of metal or rigid material forming methods including molding, stamping, welding and other methods readily recognized by those of ordinary skills in the metal and rigid materials arts. When the said cam follower (150) is formed at one or both of the jaw outer surface (115) of the said first jaw (110) and or the said second jaw (120), the said cam (150), in this alternative embodiment, is formed at the handle arm cam surface(187) most proximal to one or both of the said jaw outer surface (115) at which the said cam follower (160) is formed. The cam (150) whether in the preferred or an alternative embodiment may be welded, stamped, molded or affixed or formed by methods known to those skilled in the art.

The said at least one jaw interconnection stabilizer (130), in the alternative embodiment and when comprised of a sheet metal strip (205), has a width greater than the maximum jaw spacing (125) and a length less than the length of the distance from the jaw front edge (117) to the jaw rear edge (118). The said handle pivot bolt (175) is a bolt received through the said first jaw (110), the said jaw spacer (140) and the said second jaw (120) to allow rotation of the handle assembly (162). An alternative embodiment of the at least one jaw interconnection stabilizer (130) is comprised of a sheet metal strip (205) having a notch intermediate the said jaw front edge (117) and the said jaw rear edge (118) thereby reducing contact with the handle arm cam surface (187).

The preferred embodiment for the at least one jaw interconnection stabilizer (130) is a plurality of bolts received through the said first jaw (110), the said jaw spacer (140) and the said second jaw (120) to allow rotation of the handle assembly (162). In the preferred embodiment the said handle pivot bolt (175) is coincident with one of the plurality of bolts to allow rotation of the handle assembly (162).

Another alternative embodiment has a jaw flange (112) extending outwardly from said first jaw (110) and said second jaw (120) proximal to or at the jaw bottom edge (114). The jaw flange (112) is planar and would fulfill an additional surface support, where the panel was, for example, a multi-pane window frame having a nail fin, to rest against a portion of said window frame. When a jaw flange (112) is utilized a cam (150) can be formed in the said jaw flange (112) most distal to the first jaw (110) and or the second jaw (120). In this alternative embodiment the cam (150) comprises a cam cutout (320) forming a cam lobe cutout (322) and a cam rest cutout (324). In this embodiment, a cam follower (160) fixed at the handle arm cam surface (187), or protruding from the said handle arm cam surface (187) of the said bottom yoke first arm (185) and or the said handle bottom yoke second arm (186), is most proximal the said jaw flange (112) from the respective first jaw (110) or second jaw (120). The cam follower (160) is a smooth surface or a roller as seen in FIGS. 9, 15, 15A, 17, 19, 31 and 33.

FIG. 29 through 32 show the panel gripping and lifting device (1000) with g a clamping assembly (1005) having a handle assembly (1620) which is rotatably interrelated with a spaced apart opposing jaw assembly (1007). The panel gripping and lifting device (1000) and all elements thereto are formed from rigid materials generally metals. The jaws of the opposing jaw assembly (1007) have a jaw outer surface (1150) and a planar jaw bottom edge (1140). When a spacing between the jaws is increased, the planar jaws are fitted on either side of a frame channel (2000) and when the handle assembly (1620) is rotated upwardly the spacing between the jaws is lessened and the said the planar jaws bottom edges (1140) are parallel and contact opposing surfaces of the frame channel (2000) exerting a gripping force against the frame channel (2000). When gripping forces are exerted against the frame channel (2000) the handle assembly (1620) enables the lifting and moving of the frame channel (2000) where the frame channel (2000) comprises a portion of a frame such as that of a sliding window pane door units and sealed multi-pane window frame.

Also seen in FIG. 29 through 32 is the jaw assembly (1007) which comprises a first jaw (1100) and a second jaw (1200). The said first jaw (1100) and said second jaw (1200) are spaced apart by a jaw spacing (1250). The said first jaw (1100) and the said second jaw (1200) are rotatably affixed to the handle assembly (1620) and the said first jaw (1100) and the said second jaw (1200) rotate in the same plane. The spacing of the jaw spacing (1250) is lessened and increased by the rotation of the handle assembly (1620). The handle assembly (1620) is generally horizontal in preparation for fitting of the said jaw assembly (1007) at the frame channel (2000). The handle assembly (1620) has a handle (1700) where the said handle (1700) is distal to the first jaw (1100) and the said second jaw (1200) is intermediate the said first jaw (1100) and the handle (1700).

The jaw spacing (1250) is lessened with the upward movement of the handle (1700) offsetting the said first jaw (1100) from the said second jaw (1200) and clamping the frame channel (2000) between said first jaw (1100), at the said first jaw (1100) jaw bottom edge (1140) and said second jaw (1200), at the said second jaw (1200) jaw bottom edge (1140), thereby causing a lifting force at the frame channel (2000).

The said first jaw (1100) and said second jaw (1200) are generally U shaped having a jaw top edge (1130) proximal the open end of the U shape, a jaw bottom edge (1140) proximal the closed end of the U shape and an jaw outer surface (1150). The jaw bottom edge is planar. A shaft aperture (1300) is at the said jaw top edge (1130). The said handle assembly (1620) having a shaft aperture (1300) distal to the handle (1700) which receives a shaft (1301) and pivotally interconnects the said first jaw (1100) to the handle assembly (1620). The said second jaw (1200) having a shaft aperture (1300) proximal the jaw top edge (1130). An elongated jaw arm (1400) has a jaw arm first end (1403) and a jaw arm second end (1410). There is one or a plurality of shaft apertures (1300) proximal to said jaw arm first end (1403) and intermediate the said jaw arm first end (1403) and the said jaw arm second end (1410). The shaft aperture (1300) at the second jaw (1200) receives a shaft (1301) and pivotally interconnects the said second jaw (1200) to the said jaw arm (1400) at one of the one or a plurality of shaft apertures (1300) at the jaw arm (1400). The said handle assembly (1620) having a shaft aperture (1300) proximal the handle (1700) which receives a shaft (1301) and pivotally interconnects the said jaw arm (1400) proximal the said jaw arm second end (1410) to the handle assembly (1620). The said handle assembly (1620) having a jaw arm recess (1450) proximal the said jaw arm second end (1410). The said handle assembly (1620) having handle stop (1710) at the said jaw arm second end (1410). The said jaw arm second end (1410) having a jaw arm stop (1411) at the handle stop (1710) and a jaw arm rotation (1412) proximal the jaw arm recess (1450). The said second jaw (1200) rotation is stopped by contact between the said handle stop (1710) and the said jaw arm stop (1411). The said second jaw (1200) rotation occurs between the said jaw arm recess (1450) and the said jaw arm rotation (1412). The said jaw arm stop (1411) and the said handle stop (1710) are generally formed by flats which mate and terminate rotation. The said jaw arm rotation (1412) and the said jaw arm recess (1450) are generally formed by curved or sloped surfaces which allow rotation.

The said handle assembly (1620) is comprised of a handle frame (1715) having an outwardly extending "U" shaped handle yoke (1716). The handle yoke (1716) at the open "U" has a handle (1720) secured by a shaft (1301). A first jaw spring (1105) is affixed to the handle assembly (1620) most distal to the handle (1720) and in alignment with and with movement in the same plane as that of the first jaw (1100) and proximal to the first jaw (1100) to urge the first jaw (1100) into a position for ease of mating with the frame channel (2000).

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

I claim:

1. A panel gripping and lifting device (100) comprising
a clamping assembly (105) having a handle assembly (162) rotatably interrelated with a spaced apart opposing jaw assembly (107) by a cam assembly (149); and
jaws of the opposing jaw assembly (107) have a planar jaw inner surface (116); when the spacing between the jaws is increased, the planar jaws are fitted on either side of a panel; when the spacing between the jaws is lessened the planar jaws contact surfaces of the panel exerting a gripping force against the panel; and
when gripping forces are exerted against the panel the handle assembly (162) enables the lifting and moving of the panel by compression and relaxation of the said jaw assembly (107); and
the jaw assembly (107) comprises a planar first jaw (110) in parallel with a planar second jaw (120); said first jaw (110) and said second jaw (120) are spaced apart by a jaw spacing (125) and are moveably interconnected by at least one rigid jaw interconnection stabilizer (130); and,
an elastic jaw spacer (140) is placed, in the jaw spacing (125), between said first jaw (110) and said second jaw (120) at or proximal to the jaw top edge (113); and,
the spacing of the spaced apart opposing jaw assembly (107) is lessened and increased by a cam function of the cam assembly (149), activated by the rotation of the handle assembly (162), by compression and relaxation of the said jaw spacer (140).

2. A panel gripping and lifting device (100) depending from claim 1 and further comprising:
the said planar first jaw (110) and the said planar second jaw (120) each have a jaw outer surface (115) and a jaw inner surface (116); and,
the said first jaw (110) and said second jaw (120) each have a jaw top edge (113) a jaw bottom edge (114), a jaw front edge (117) and a jaw rear edge (118); and, the elastic jaw spacer (140) is comprised of at least one spring or an elastomer; and,
the handle assembly (162) is rotatably fixed to the planar first jaw (110) and the planar second jaw (120) by at least at least one rigid jaw interconnection stabilizer (130) comprising a handle pivot (175).

3. A panel gripping and lifting device (100) depending from claim 2 and further comprising:
when the elastic jaw spacer (140) is comprised of an elastomer the said elastomer extends from or proximal to the jaw top edge (113) toward the jaw bottom edge (114) terminating intermediate the jaw top edge (113) and the jaw bottom edge (114); the at least one rigid jaw interconnection stabilizer (130), interconnecting the said first jaw (110) and the said second jaw (120) proximal the jaw top edge (113), penetrate the said elastomer; and,
the said handle assembly (162) is comprised of a handle frame (170) having an upwardly extending "U" shaped handle top yoke (171) and a downwardly extending inverted "U" shaped handle bottom yoke (174); the said handle top yoke (171) having an upwardly extending handle top yoke first arm (181) and an upwardly extending handle top yoke second arm (182); a handle grip (172) rotatably positioned between said handle top yoke first arm (181) and handle top yoke second arm (182) by a handle grip bolt (173); and
the said handle bottom yoke (174) having a downwardly extending handle bottom yoke first arm (185) and a handle bottom yoke second arm (186); each of the said bottom yoke first arm (185) and the said bottom yoke second arm (186) has a handle arm cam surface (187); and,
when the said first jaw (110) and said second jaw (120) are spaced apart by the maximum jaw spacing (125) the jaw assembly (107) fits between the said bottom yoke first arm (185) and the said bottom yoke second arm (186); a handle pivot bolt (175) extends through the said bottom yoke first arm (185), slidably extends through the said first jaw (110), the elastic jaw spacer (140), the said second jaw (120) and the said bottom yoke second arm (186) and thereby rotatably interconnects the said handle assembly (162) with the said jaw assembly (107); and,
a cam assembly (149) is comprised of a cam (150) aligned with a cam follower (160) and is assembled in said panel gripping and lifting device (100) so that the cam follower (160) is in contact with the cam (150) when the said handle assembly (162) is rotated.

4. A panel gripping and lifting device (100) depending from claim 3 and further comprising:
the handle pivot bolt (175) extends through the said first jaw (110), the elastic jaw spacer (140), the said second jaw (120) proximal the said jaw top edge (113); and,
the said cam (150) has a cam rest (152) and a cam lobe (154); and, the said at least one jaw interconnection stabilizer (130) is rigid; and,
the jaw inner surface (116) is rough or covered with a poly or rubber material to facilitate friction and a secure grasp of a panel.

5. A panel gripping and lifting device (100) depending from claim 4 and further comprising:
   the said cam (150) is formed at one or both of the jaw outer surface (115) of the said first jaw (110) and or the said second jaw (120); when the said cam assembly (149) is formed at one or both of the jaw outer surface (115) of the said first jaw (110) and or the said second jaw (120), the said cam follower (160) is integral to handle bottom yoke first arm (185) and or the said handle bottom yoke second arm (186) extending toward the said proximal jaw outer surface (115) from the the handle arm cam surface (187).

6. A panel gripping and lifting device (100) depending from claim 5 and further comprising:
   the said cam (150) is outwardly extending from the said one or both jaw outer
   surface (115) or is recessed and inwardly extending from the said one or both jaw
   outer surface (115); and,
      when the said cam follower (160) is integral to the handle arm cam surface (187), the cam follower (160) is the end of a removable cam follower shaft (165) which extends through the handle bottom yoke first arm (185) and or the said handle bottom yoke second arm (186) presenting the cam follower (160) at the handle arm cam surface (187) for contact with the cam (150).

7. A panel gripping and lifting device (100) depending from claim 4 and further comprising:
   the said cam follower (160) is formed at one or both of the jaw outer surface (115) of the said first jaw (110) and or the said second jaw (120); when the said cam follower (150) is formed at one or both of the jaw outer surface (115) of the said first jaw (110) and or the said second jaw (120), the said cam (150) is formed at the handle arm cam surface(187) most proximal to one or both of the said jaw outer surface (115) at which the said cam follower (160) is formed.

8. A panel gripping and lifting device (100) depending from claim 4 and further comprising:
   the said at least one jaw interconnection stabilizer (130) is comprised of a sheet metal strip (205) having a width greater than the maximum jaw spacing (125) and a length less than the length of the distance from the jaw front edge (117) to the jaw rear edge (118); and,
   the said handle pivot bolt (175) is a bolt received through the said first jaw (110), the said jaw spacer (140) and the said second jaw (120) to allow rotation of the handle assembly (162).

9. A panel gripping and lifting device (100) depending from claim 8 and further comprising:
   the said at least one jaw interconnection stabilizer (130) is comprised of a sheet metal strip (205) having a notch intermediate the said jaw front edge (117) and the said jaw rear edge (118) thereby reducing contact with the handle arm cam surface (187).

10. A panel gripping and lifting device (100) depending from claim 4 and further comprising:
    the said at least one jaw interconnection stabilizer (130) is a plurality of bolts received through the said first jaw (110), the said jaw spacer (140) and the said second jaw (120) to allow rotation of the handle assembly (162); and,
    the said handle pivot bolt (175) is coincident with one of the plurality of bolts to allow rotation of the handle assembly (162).

11. A panel gripping and lifting device (100) depending from claim 10 and further comprising:
    the cam (150) has a radius corresponding to the radius transcribed by the rotation of the handle assembly (162).

12. A panel gripping and lifting device (100) depending from claim 4 and further comprising:
    a jaw flange (112) extending outwardly from said first jaw (110) and said second jaw (120) proximal to or at the jaw bottom edge (114).

13. A panel gripping and lifting device (100) depending from claim 12 and further comprising:
    a cam (150) formed in the said jaw flange (112) most distal to the first jaw (110) and or the second jaw (120); the cam (150) comprising a cam cutout (320) forming a cam lobe cutout (322) and a cam rest cutout (324); and,
    a cam follower (160) fixed at the handle ruID cam surface (187) of the said bottom yoke first arm (185) and or the said handle bottom yoke second arm (186) most proximal the said jaw flange (112); and,
    the cam follower (160) is a smooth surface or a roller.

14. A panel gripping and lifting device (100) comprising the following:
    a clamping assembly (105) having a handle assembly (162) rotatably interrelated with a spaced apart opposing jaw assembly (107) by a cam assembly (149); and
    jaws of the opposing jaw assembly (107) have a planar jaw inner surface (116); when the spacing between the jaws is increased, the planar jaws are fitted on either side of a panel; when the spacing between the jaws is lessened the planar jaws contact surfaces of the panel exerting a gripping force against the panel; and
    when gripping forces are exerted against the panel the handle assembly (162) enables the lifting and by compression and relaxation of a jaw spacer (140); and,
    the jaw assembly (107) comprises a planar first jaw (110) in parallel with a planar second jaw (120); said first jaw (110) and said second jaw (120) are spaced apart by a jaw spacing (125) and are moveably interconnected by at least one rigid jaw interconnection stabilizer (130); and,
    the elastic jaw spacer (140) is placed, in the jaw spacing (125), between said
    first jaw (110) and said second jaw (120) at or proximal to the jaw top edge (113); and,
    the spacing of the spaced apart opposing jaw assembly (107) is lessened and increased by a cam function of the cam assembly (149), activated by the rotation of the handle assembly (162), by compression and relaxation of the said jaw spacer (140); and,
    the said planar first jaw (110) and the said planar second jaw (120) each have a jaw outer surface (115) and a jaw inner surface (116); and,
    the said first jaw (110) and said second jaw (120) each have a jaw top edge (113) a jaw bottom edge (114), a jaw front edge (117) and a jaw rear edge (118); and, the elastic jaw spacer (140) is comprised of at least one spring or an elastomer; and,
    the handle assembly (162) is rotatably fixed to the planar first jaw (110) and the planar second jaw (120) by at least at least one rigid jaw interconnection stabilizer (130) comprising a handle pivot (175).

* * * * *